United States Patent
Ji et al.

(10) Patent No.: US 10,044,707 B1
(45) Date of Patent: Aug. 7, 2018

(54) TOKEN-BASED ACCESS CONTROL

(71) Applicant: INTERNATIONAL BUSINESS MACHINES CORPORATION, Armonk, NY (US)

(72) Inventors: Zi Lian Ji, Shanghai (CN); Ping Li, Shanghai (CN); Yong Chao Li, Shanghai (CN); Xian Dong Meng, Shanghai (CN); Zhao Li Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/844,926

(22) Filed: Dec. 18, 2017

Related U.S. Application Data (63) Continuation of application No. 15/624,731, filed on Jun. 16, 2017.

(51) Int. Cl.
  *H04L 29/06* (2006.01)
  *H04L 9/32* (2006.01)
  *H04B 10/116* (2013.01)
  *G06F 3/06* (2006.01)

(52) U.S. Cl.
  CPC .......... *H04L 63/083* (2013.01); *G06F 3/065* (2013.01); *G06F 3/0619* (2013.01); *G06F 3/0685* (2013.01); *H04B 10/116* (2013.01); *H04L 9/3213* (2013.01); *H04L 9/3297* (2013.01)

(58) Field of Classification Search
  CPC ... H04L 63/083; H04L 9/3213; H04L 9/3297; H04B 10/116; G06F 3/0619; G06F 3/065; G06F 3/0685
  See application file for complete search history.

(56) References Cited

U.S. PATENT DOCUMENTS

| 8,941,465 | B2 | 1/2015 | Pineau et al. |
| 9,124,573 | B2 | 9/2015 | Chastain et al. |
| 9,710,978 | B1 * | 7/2017 | Sequeira ............ G07C 9/00007 |
| 2013/0047266 | A1 * | 2/2013 | Radhakrishnan ... H04L 63/0807 726/28 |

(Continued)

FOREIGN PATENT DOCUMENTS

| CN | 104517336 A | 4/2015 |
| CN | 205405659 U | 7/2016 |

(Continued)

OTHER PUBLICATIONS

IBM: List of IBM Patents or Patent Applications Treated as Related (Appendix P), Dec. 18, 2017, pp. 1-2.

(Continued)

*Primary Examiner* — Michael Pyzocha
(74) *Attorney, Agent, or Firm* — Jordan T. Schiller (57) ABSTRACT

Implementations of the present disclosure relate to methods, systems and products for access control. In one implementation, a computer-implemented method is proposed. According to the method, a token for accessing an object is received from a terminal device via a communication channel, where the communication channel is built based on a Light Fidelity connection which is deployed within a restrictive area. A validity of the received token is determined. An access to the object is controlled based on the validity of the received token.

1 Claim, 7 Drawing Sheets

(56) References Cited

U.S. PATENT DOCUMENTS

| | | | |
|---|---|---|---|
| 2014/0025582 A1 | 1/2014 | Maevsky | |
| 2014/0255036 A1* | 9/2014 | Jovicic | H04B 10/116 398/115 |
| 2014/0266590 A1 | 9/2014 | Guillaud | |
| 2015/0358079 A1* | 12/2015 | Cronin | H04B 10/116 398/118 |
| 2016/0085488 A1* | 3/2016 | Otake | H04N 1/00127 358/1.14 |
| 2016/0165278 A1* | 6/2016 | Soma | G06Q 30/02 725/25 |
| 2016/0337863 A1* | 11/2016 | Robinson | H04W 12/08 |
| 2016/0352751 A1* | 12/2016 | Perrufel | H04L 63/0876 |
| 2017/0141926 A1* | 5/2017 | Xu | H04L 9/3263 |
| 2017/0146350 A1 | 5/2017 | Beaurepaire | |
| 2017/0181241 A1* | 6/2017 | Koo | H05B 33/0866 |
| 2017/0251365 A1* | 8/2017 | Burchardt | H04W 12/06 |
| 2017/0264364 A1* | 9/2017 | Aoyama | H04B 10/116 |
| 2017/0294088 A1* | 10/2017 | Patterson | G08B 13/184 |
| 2017/0318460 A1* | 11/2017 | Kumar | H04W 12/06 |
| 2017/0337550 A1* | 11/2017 | Aparicio Ruiz | G06Q 20/385 |

FOREIGN PATENT DOCUMENTS

| | | |
|---|---|---|
| EP | 2579220 A1 | 4/2013 |
| WO | 2014085128 A1 | 6/2014 |

OTHER PUBLICATIONS

Stroh, "Li-Fi Offers New Technology for Indoor Positioning," Directions Magazine, http://www.directionsmag.com/entry/li-fi-offers-new-technology-for-indoor-positioning/386499, Printed on Jun. 7, 2017, Copyright 2017 Directions Media, pp. 1-8.

Harler, "Future Tech: Seeing the Light," Integrators SD&I, SecurityInfoWatch, http://www.securityinfowatch.com/article/12103850/light-enabled-wi-fi-may-be-the-future-of-secure-communications-technology, Sep. 10, 2015, Printed on Jun. 7, 2017, pp. 1-8.

Disclosed Anonymously, "System and method of automatic registration by LiFi(Light Fidelity)," An IP.com Prior Art Database Technical Disclosure, IP.com No. IPCOM000247621D IP.com, Electronic Publication Date: Sep. 21, 2016, pp. 1-3.

Rajitha et al., "Zigbee Based Smart Authentication and Access Control System Using ARM7," IJESC, vol. 6, Issue No. 5, Research Article, © 2016 IJESC (Best Date Available), pp. 1-5.

Fox, "Visible Light Communications and Indoor Positioning Systems," IHS Technology—Abstract, Nov. 2014, technology.ihs.com, Copyright 2014 IHS, pp. 1-1.

Ji et al., Pending U.S. Appl. No. 15/624,731, filed Jun. 16, 2017, titled "Token-Based Access Control,", pp. 1-32.

* cited by examiner

TOKEN-BASED ACCESS CONTROL

BACKGROUND

The present disclosure generally relates to access control. Specifically, the present disclosure relates to methods, systems and products for controlling an access to an object.

Nowadays, access control is critical in almost every industry. In an ordinary company, there may be many situations of access control. Usually, employees of the company may use their badges for unlocking the doors of the office and accessing other types of objects such as printers, fax machines, and the like. However, an irrelevant person may enter into the office and access objects in the office by using an illegally obtained badge. Meanwhile, when the company has multiple branch offices with individual access control systems, the employee may have to enter each of the offices with a respective badge. Accordingly, how to control the access to various types of objects in a flexible and safe way becomes a focus.

BRIEF SUMMARY

In one aspect, a computer-implemented method is proposed. According to the method, a token for accessing an object is received from a terminal device via a communication channel, where the communication channel is built based on a Light Fidelity (Li-Fi) connection which is deployed within a restrictive area. A validity of the received token is determined. An access to the object is controlled based on the validity of the received token.

In another aspect, a computer-implemented computing system is proposed. The computing system comprises a computer processor coupled to a computer-readable memory unit, the memory unit comprising instructions that when executed by the computer processor implements a method. In the method, a token for accessing an object is received from a terminal device via a communication channel, where the communication channel is built based on a Light Fidelity connection which is deployed within a restrictive area. A validity of the received token is determined. An access to the object is controlled based on the validity of the received token.

In another aspect, a computer program product is proposed. The computer program product comprises a computer readable storage medium having program instructions embodied therewith, the program instructions executable by an electronic device to cause the electronic device to: receive a token for accessing an object from a terminal device via a communication channel, the communication channel being built based on a Light Fidelity connection which is deployed within a restrictive area; determine a validity of the received token; and control an access to the object based on the validity of the received token.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some implementations of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
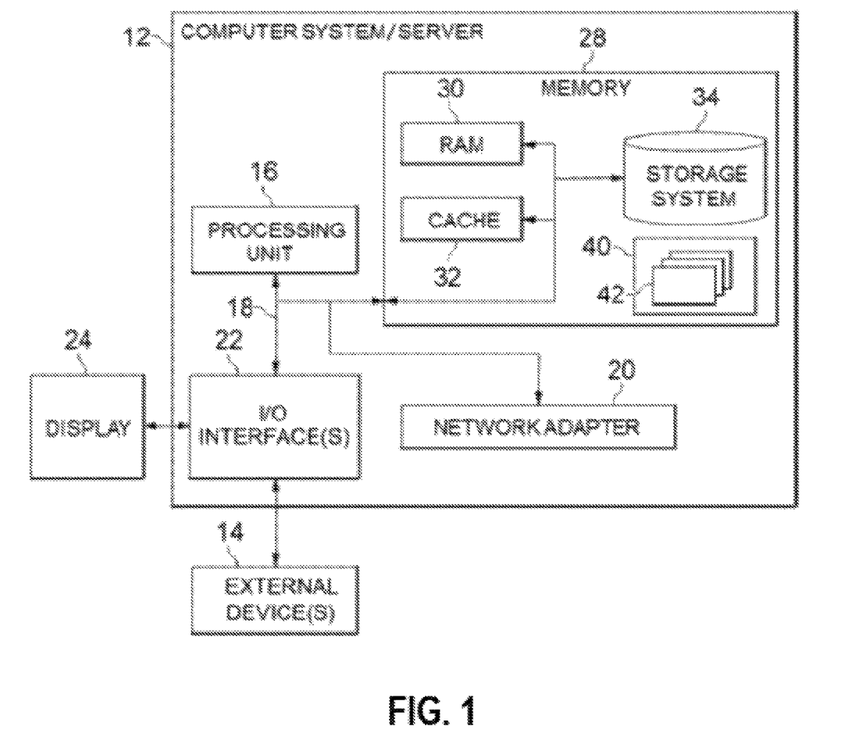
FIG. 1 schematically illustrates an example computer system/server 12 in which implementations of the present disclosure may be implemented.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some approaches have been proposed to implement the access control. In one approach, passwords may be used to enhance the security level. However, when the multiple branch offices have individual access systems, multiple badges should be allocated to the employee such that the employee can enter into the respective offices by using the respective badges. The multiple badges and passwords might possibly cause a confusion.

In order to at least partially solve the above and other potential problems, a new method and system for access control are proposed herein. According to implementations of the present disclosure, a token for accessing an object is received from a terminal device via a communication channel, where the communication channel is built based on a Light Fidelity connection which is deployed within a restrictive area. A validity of the received token is determined. An access to the object is controlled based on the validity of the received token.

Figure 2:
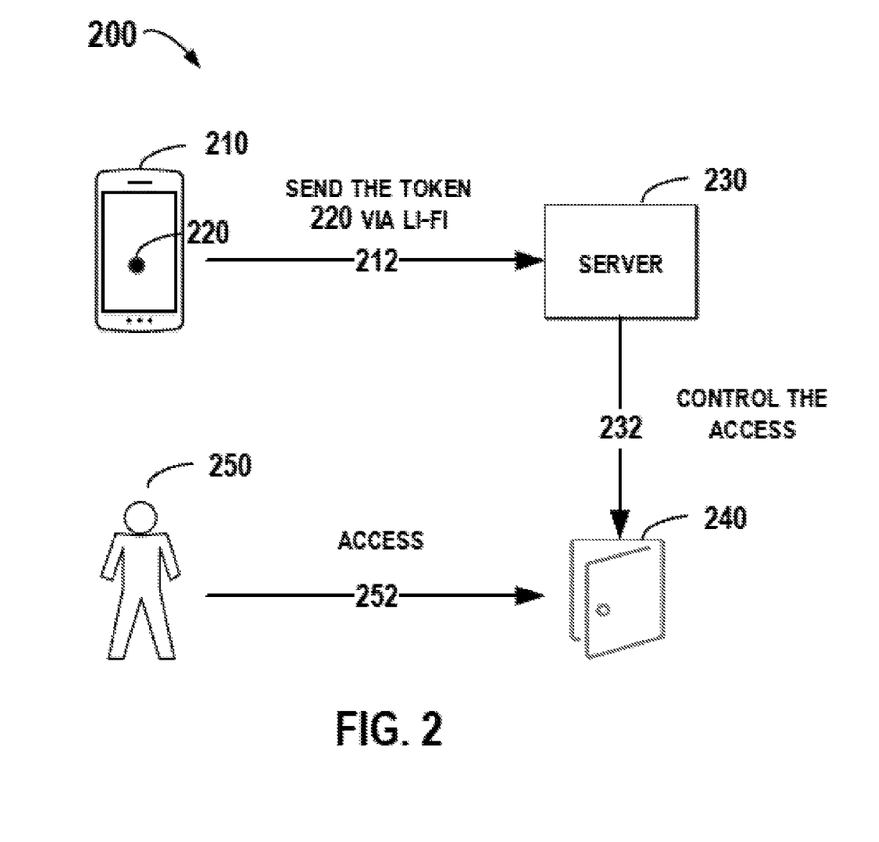
FIG. 2 schematically illustrates an example diagram for access control according to one implementation of the present disclosure.

In the context of the present disclosure, the token may be a credential for accessing the object. Whether the object is allowed to be accessed may be determined according to the validity of the token. Hereinafter, details of the implementations will be described by discussing an illustrative example: controlling access to an office by unlocking the door to the office. It is to be understood that the access control is not limited to unlocking the door to an office. Access control may also be performed on other objects such as printers, fax machines, and the like. Reference will be made to FIG. 2 to describe the implementation, where FIG. 2 illustrates an example diagram 200 for access control according to one implementation of the present disclosure.

According to FIG. 2, a terminal device 210 such as a cell phone, or the like, may be used to replace the badge, where a token 220 is stored in the terminal device 210. The token 220 may be sent (212) to a server 230, for example, via a Light Fidelity connection. The server 230 is configured to control the states (e.g. locked or unlocked) of a door 240. The server 230 may determine the validity of the token 220, and control (232) the state of the door 240 according to the validity. For example, if the token 220 is valid the server 230 may unlock the door and allow the user 250 holding the terminal device 210 to enter. At this time, the user 250 may be permitted to unlock the door 240, and gain access (252). Otherwise, the server 230 may inform the door to remain locked.

Although FIG. 2 illustrates one implementation by taking a cell phone as an example of the terminal device 210, the terminal device 210 may be implemented by a general purpose device (such as a smart phone, a tablet, and the like) or a dedicated device with an embedded system. Further, with the development of the device, the terminal device 210 may be implemented by another type of device, as long as the device is of the capabilities of receiving and sending data associated with the token 220.

In the above implementation, Light Fidelity is a bidirectional, high-speed and fully networked wireless communication technology. It uses visible-light communication or infrared and near-ultraviolet instead of radio-frequency spectrum, which may carry much more information with a higher security level. The token 220 may be preloaded into the terminal device 210. The token 220 may be used for accessing one or more objects, for example, for unlocking one or more doors in the office(s). With the above implementation, when walking around multiple offices, the user 250 may use the terminal device 210 and the token 220 for unlocking the doors in these offices. Further, effective range of the Li-Fi is limited to be within a specific geographic area. For example, the Li-Fi resource may be deployed near or within the working area of the company, and thus the staff of the company may watch out for the suspects. Thereby, the proposed implementation may enhance the security level of the access control and enable the user to access multiple objects with a same terminal device.

Figure 3:
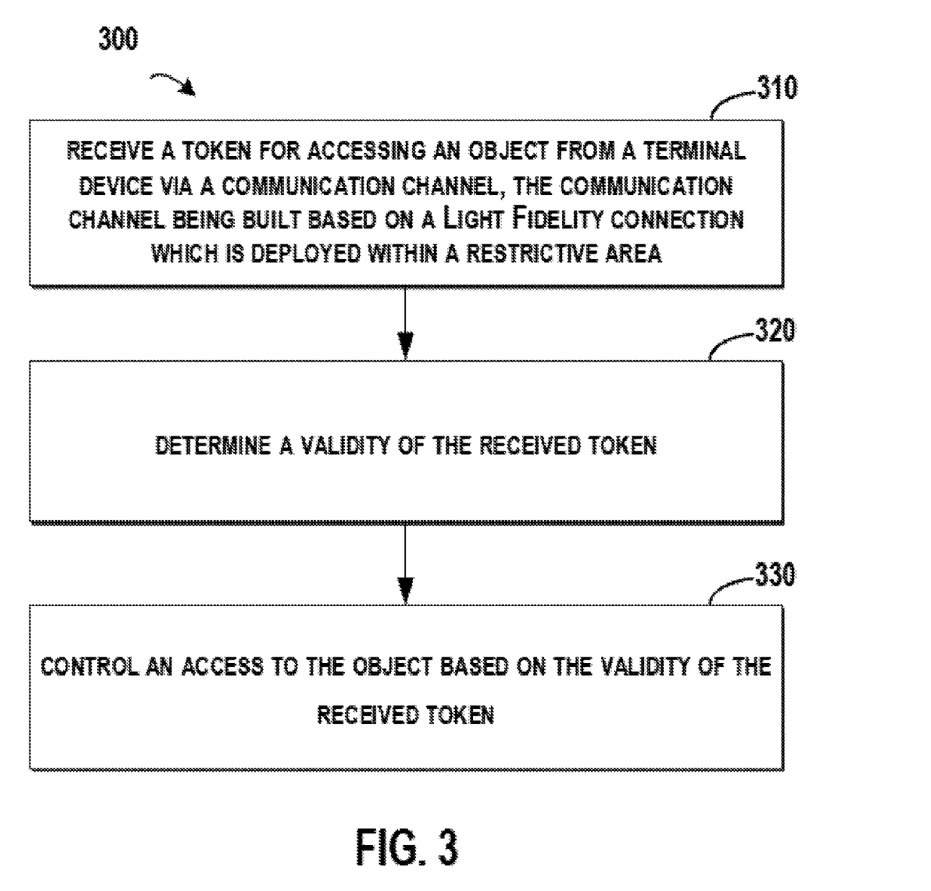
FIG. 3 schematically illustrates an example flowchart of a method for access control according to one implementation of the present disclosure.

FIG. 3 schematically illustrates an example flowchart of a method 300 for access control according to one implementation of the present disclosure. At step 310, a token for accessing an object is received from a terminal device via a communication channel, where the communication channel is built based on a Light Fidelity connection which is deployed within a restrictive area. Here, an access control application may be installed on the terminal device. Further, the restrictive area may be an area in which the terminal device may build a communication channel with a server that may implement the access control based on a Light Fidelity connection. In an environment for unlocking the door of an office, the restrictive area may be an area near the door where the Light Fidelity sensor is deployed.

In this implementation, the token may be loaded, in advance, in a security area of an access control application installed in the terminal device. The present disclosure does not limit the manner for loading the token into the terminal device. In one implementation, the token may be loaded when the terminal device is installed with the application. In another implementation, the token may be loaded in response to a request from the access control application being accepted.

With continued reference to FIG. 3, at step 320, a validity of the received token is determined. The server, as illustrated in FIG. 2, may determine the validity. Here, the token may be defined by various data structures. For example, the token may be defined as an array or a bit string with a predefined length. Further, multiple methods may be used in determining the validity of the received token. In one example, copies of the tokens may be stored in a database when these tokens are generated, and these copies may be used as bases for determining whether the received token is a valid one. Specifically, the token received from the terminal device may be searched in the database to determine whether the database includes a copy that matches the received token, and a matched copy may indicate that the received token is valid. In another example, it may be determined that a valid token satisfies a predefined rule, and then the received token may be checked based on the rule to find out whether it is valid or not.

With continued reference to FIG. 3, at step 330, an access to the object is controlled based on the validity of the received token. Once the received token is a valid one, the permission for accessing the object may be issued. Referring back to FIG. 2, the door 240 may be unlocked to allow the user 250 to enter. In other implementations, the object may be a printer, a fax machine, or a door in another office. The object may be deployed in the restrictive area. Alternatively, the object may be deployed in another area.

It is to be understood that the token may be associated with one or more objects in one or more restrictive areas. Further, types and numbers of the accessible objects may depend on a privilege of the user. For example, a manager in the company may have a higher privilege than an ordinary engineer. The following paragraphs will describe how to generate and send the token to the terminal device.

According to one implementation of the present disclosure, in response to receiving an access request, a privilege of a user of the terminal device may be determined; a token may be generated based on the privilege of the user; and the generated token may be sent to the terminal device.

In this implementation, the user may log into the application on the terminal device with a unique identification (for example, the ID of the employee), and the privilege may be determined according to the unique identification. The privilege may be defined in various manners. In one implementation, an object list may be defined for each user, where the list includes the objects that are accessible to the user. For example, for a manager in the company, the object list may be defined as: {Door_Beijing, Door_Shanghai}, which indicates that the manager may unlock the doors in both Beijing and Shanghai offices. While for an engineer, the object list may be defined as: {Door_Beijing}, which indicates that the engineer may only unlock the door in Beijing office. In another implementation, the privilege may be defined in other manners.

Once the privilege is determined, a corresponding token may be generated based on the privilege of the user; and then the generated token may be sent to the terminal device. In one implementation, the generated token may be transmitted to the terminal device via Li-Fi connection. In another implementation, the generated token may be transmitted via other communication channels such as a wired connection or a wireless connection. In some implementations, techniques for encryption and decryption may be utilized in the transmitting and receiving procedures to further enhance the security level.

According to one implementation of the present disclosure, a copy of the generated token may be saved. Further, in order to determine a validity of the received token, the validity may be identified as valid in response to the received token matching the saved copy.

In the implementation, the copy of the token may be stored in a database for further comparison. In one implementation, the database may be deployed in the server; and in another implementation, the database may be separated from the server, as long as the server may access the copy in the database for the comparison. Upon receipt of the token from the terminal device, the token may be compared with the copy. A match between the two items indicates a valid token, which means the object may be accessible. Referring back to the example of FIG. 2, the door 240 of the office may be unlocked and the user 250 may enter the office. On the other hand, a mismatch between the token and the copy means the object is not accessible and the door 240 may remain locked because the token is not a valid one.

Figure 4:
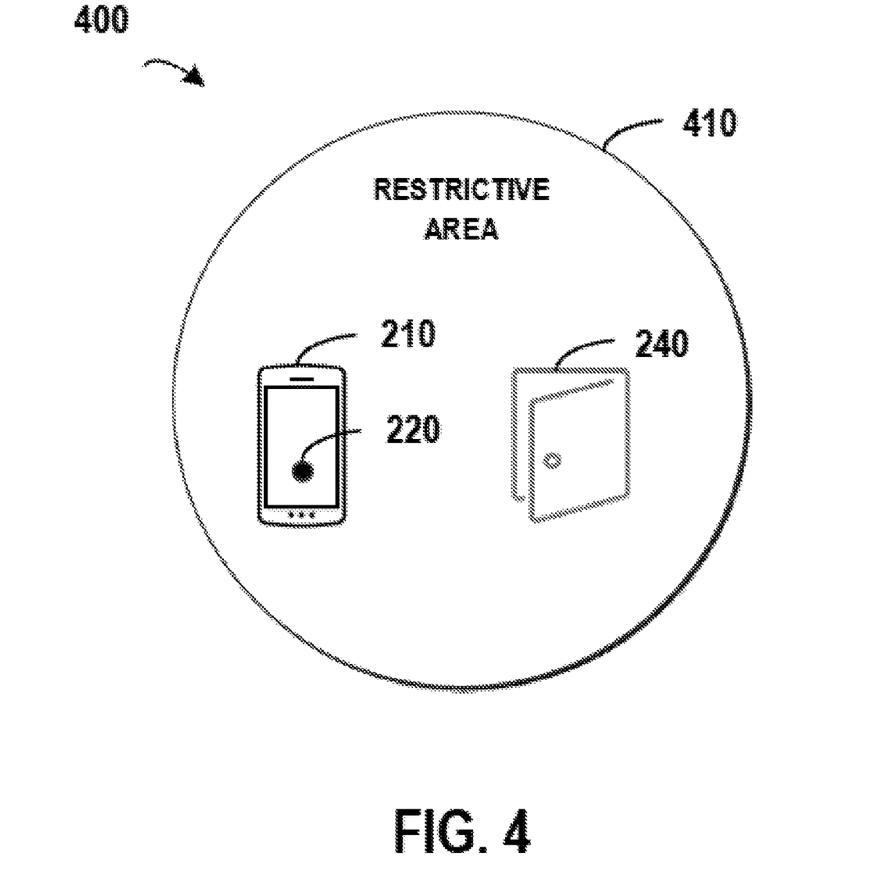
FIG. 4 schematically illustrates an example diagram for accessing an object associated with one restrictive area according to one implementation of the present disclosure.

FIG. 4 schematically illustrates an example diagram 400 for accessing an object such as the door 240 according to one implementation of the present disclosure. In the context of the present disclosure, the restrictive area 410 indicates a geographic area. Referring to the example of unlocking the door 240 of the office, the Li-Fi connection may be deployed near the door 240, and then the area covered by the Li-Fi connection may be considered as the restrictive area 410.

According to one implementation of the present disclosure, a further token for accessing a further object may be received from the terminal device via a further communication channel, where the further communication channel is built based on a further Light Fidelity connection which is deployed within the further restrictive area. The validity of the token may be determined; and an access to a further object may be controlled based on the validity of the received further token.

Figure 5:
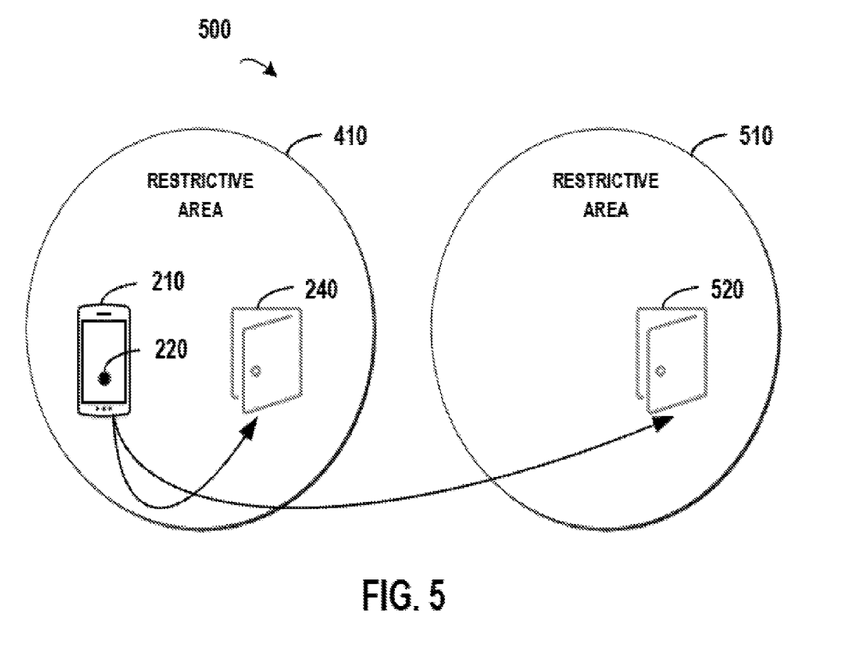
FIG. 5 schematically illustrates an example diagram for accessing objects associated with multiple restrictive areas according to one implementation of the present disclosure.

FIG. 5 schematically illustrates an example diagram 500 for accessing objects associated with multiple restrictive areas according to one implementation of the present disclosure. This figure illustrates another embodiment where the user holding the terminal device 210 may access another door 520 in another restrictive area 510. As described in the preceding paragraphs, the token is generated based on the privilege of the user. If the privilege specifies that the user may access multiple objects associated with one or more restrictive areas, then the token may be a credential for accessing these multiple objects. In the above example of the manager, the manager is allowed to unlock the doors in both the Beijing office and the Shanghai office. As indicated in FIG. 5, the token 220 may be accepted in both of the restrictive areas 410 (Beijing office) and 510 (Shanghai office) to unlock the doors 240 and 520. In another example, if the user is an engineer who is permitted to only unlock the door in Beijing office, then the engineer's token will be rejected in the restrictive area 510.

According to one implementation of the present disclosure, an expiration period may be defined to increase the security level. In order to determine a validity of the received token, a timestamp may be determined and the validity may be identified as invalid in response to a timestamp of the token being expired. The expiration period may be set to a predefined value according to the specific environment of the implementation. In one example, the expiration period may be set to 10 hours because the user may enter into/go out of the office during working hours. In another example, if the restrictive area is a confidential area such as a control center, the expiration period may be reduced to 2 hours or be set to another time period.

According to one implementation of the present disclosure, the validity of the saved copy may be identified as invalid in response to the communication channel being disconnected. If the user holding the terminal device walks out of the restrictive area, there may be a risk that the terminal device is taken by an irrelevant person, and the irrelevant person may unlock the door by using the token stored in the terminal device. In order to decrease the risk, the copy saved in the database may be invalidated once it is determined that the communication channel with the terminal device 210 is lost.

In this implementation, if the user holding the terminal device 210 walks out of the restrictive area, the communication channel may be disconnected and the saved copy may be invalidated. At this point, if the irrelevant person obtains the terminal device outside the restrictive area, he/she cannot unlock the door because the token cannot match the saved copy anymore.

According to one implementation of the present disclosure, the user needs to input a password before sending the token to the server. With this implementation, even if the terminal device is taken by an invader, the invader cannot access and send the token to trigger the further procedure at the server side.

In some situations, the privilege of the user may change, and thus the token may be updated accordingly. According to one implementation of the present disclosure, in response to a further accessing request, the privilege of the user may be updated. Further, the token may be updated based on the updated privilege, and then the updated token may be sent to the terminal device. With continued reference to the above example, the privilege of the engineer indicates that he/she can only unlock the door in the Beijing office. If the engineer is on a business travel to Shanghai office, the privilege may be modified to further include objects in the Shanghai office. At this point, an updated token that is generated according to the updated privilege may be sent to the terminal device of the engineer, such that the engineer may be permitted to enter into the Shanghai office.

According to one implementation of the present disclosure, the updated token may be received from the terminal device via a further communication channel, where the further communication channel is built based on a further Light Fidelity connection which is deployed within the further restrictive area. Further, a validity of the updated token may be determined; and then an access to a further object may be controlled based on the validity of the updated token.

Continuing the example of the engineer, when the engineer's terminal device is within a restrictive area in the Shanghai office, the updated token may be sent to the server for verification. As the token has been updated to further include the objects in Shanghai office, the door in Shanghai may be unlocked upon the permission by the server.

According to one implementation of the present disclosure, an individual accessing request may be sent to the server for an individual token for accessing another object. In this implementation, in response to receiving a further accessing request from the terminal device, a further privilege of the user may be determined. Then, a further token may be generated based on the further privilege of the user; and the further token may be sent to the terminal device.

With continued reference to the example of the engineer, the privilege of the engineer may be modified to further include the ability for accessing objects in the Shanghai office. At this time, an accessing request may be sent to the server to query the modified privilege. Upon detection of the modified privilege, a further token may be generated and sent to the terminal device. With the further token, the engineer may access objects in the Shanghai office.

According to one implementation of the present disclosure, an individual token may be sent to the terminal device of the user in response to the privilege being updated, and then the individual token may be used for accessing the objects associated with a further restrictive area. A further token for accessing a further object may be received at the server side from the terminal device via a further communication channel in response to the terminal device being within a further restrictive area, where the further communication channel is built based on a further Light Fidelity connection which is deployed within the further restrictive area. A further validity of the further token may be determined; and an access to the further object may be controlled based on the validity of the received token.

With continued reference to the example of the engineer, an individual token for accessing the Shanghai office may be sent to the terminal device of the engineer. Then, the token may be sent to the server when the engineer carries his/her terminal device and enters the restrictive area in the Shanghai office. In response to the token being verified, the door of the Shanghai office may be unlocked to allow access to the engineer.

The preceding paragraphs describe the actions that may be implemented at the server side, and the following paragraphs will describe the actions that may be implemented at the terminal device. According to one implementation of the present disclosure, a communication channel is built based on a Light Fidelity connection which is deployed within the restrictive area. A token for accessing an object is sent to a server via the communication channel, and an authorization for accessing the object is obtained from the server, where the authorization is determined from the token.

Figure 6:
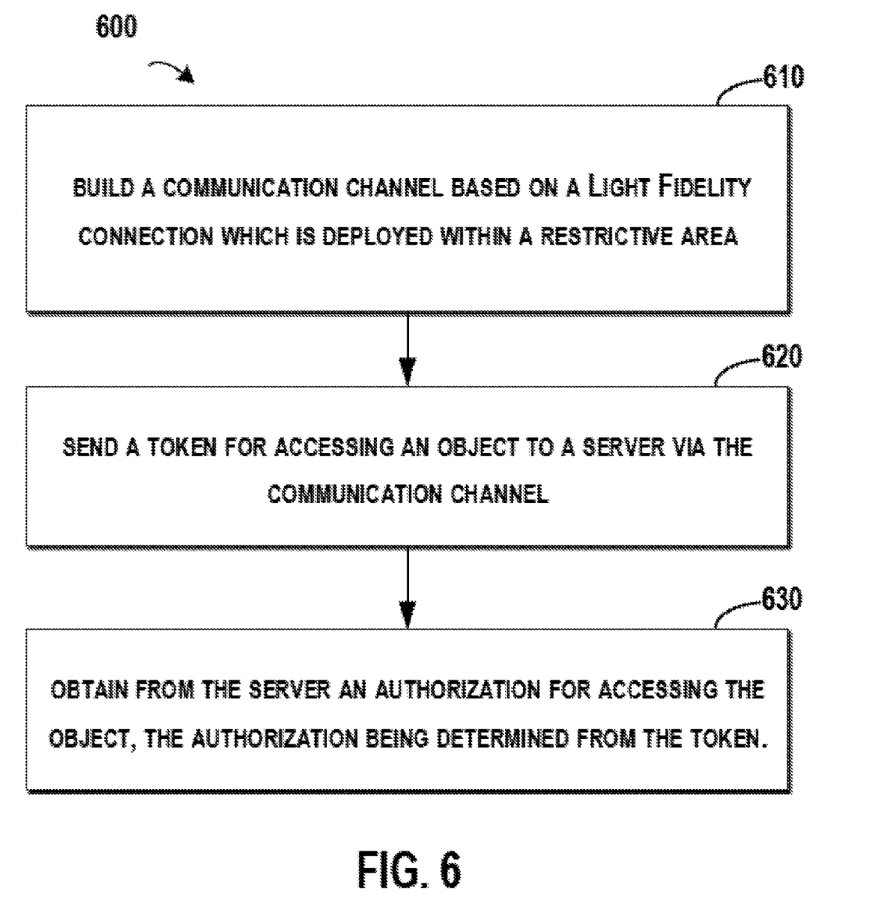
FIG. 6 schematically illustrates an example flowchart of a method for access control according to one implementation of the present disclosure.

Reference will be made to FIG. 6 to describe the implementation. FIG. 6 schematically illustrates an example flowchart of a method 600 for access control according to one implementation of the present disclosure. At step 610, a communication channel is built based on a Light Fidelity connection which is deployed within the restrictive area. In this implementation, when the user carries the terminal device and enters into the restrictive area, the communication channel, for further communication, may be built between the terminal device and the server.

At step 620, a token for accessing an object is sent to a server via the communication channel, where the token may be stored at the terminal device in advance. At step 630, an authorization for accessing the object is obtained from the server, where the authorization is determined from the token. With the obtained authorization, the user may access the object.

According to one implementation of the present disclosure, an access request for the token may be sent to the server upon logging into the terminal device, and then the token may be received from the server in response to the access request being accepted by the server. In this implementation, a password may be required for logging into the terminal device. With this implementation, even if the terminal device is taken by an invader, the invader cannot operate the terminal device to obtain the token without the password.

According to one implementation of the present disclosure, the token may be invalidated in response to a timestamp of the token being expired. An expiration period may be defined to increase the security level. In order to determine a validity of the received token, a timestamp may be determined and the validity may be identified as invalid in response to a timestamp of the token being expired.

According to one implementation of the present disclosure, the token may be invalidated in response to the communication channel being disconnected. In order to determine a validity of the received token, the validity may be identified as invalid in response to the terminal device being out of the restrictive area. If the user holding the terminal device walks out of the restrictive area, the communication channel may be disconnected. At this point, there may be a risk that the terminal device is taken by an irrelevant person, and the irrelevant person may unlock the door by using the token stored in the terminal device. Accordingly, invalidating the token when the communication channel is disconnected will enhance the security level.

According to one implementation of the present disclosure, the user of the terminal device may access the object associated with another restrictive area. In this implementation, a further communication channel may be built based on a further Light Fidelity connection which is deployed within the further restrictive area. The token for accessing a further object may be sent to the server via the further communication channel, and then a further authorization for accessing the further object may be obtained from the server. The further authorization may be determined from the token. With continued reference to the example of the manager, the manager may enter into the Beijing office with the token in his/her terminal device. Further, he/she may also enter into the Shanghai office with the same token.

According to one implementation of the present disclosure, the token may be updated with an updated version from the server. As described in the preceding paragraphs, the privilege of the user may be modified and thus the token may be updated according to the modified privilege.

Figure 7:
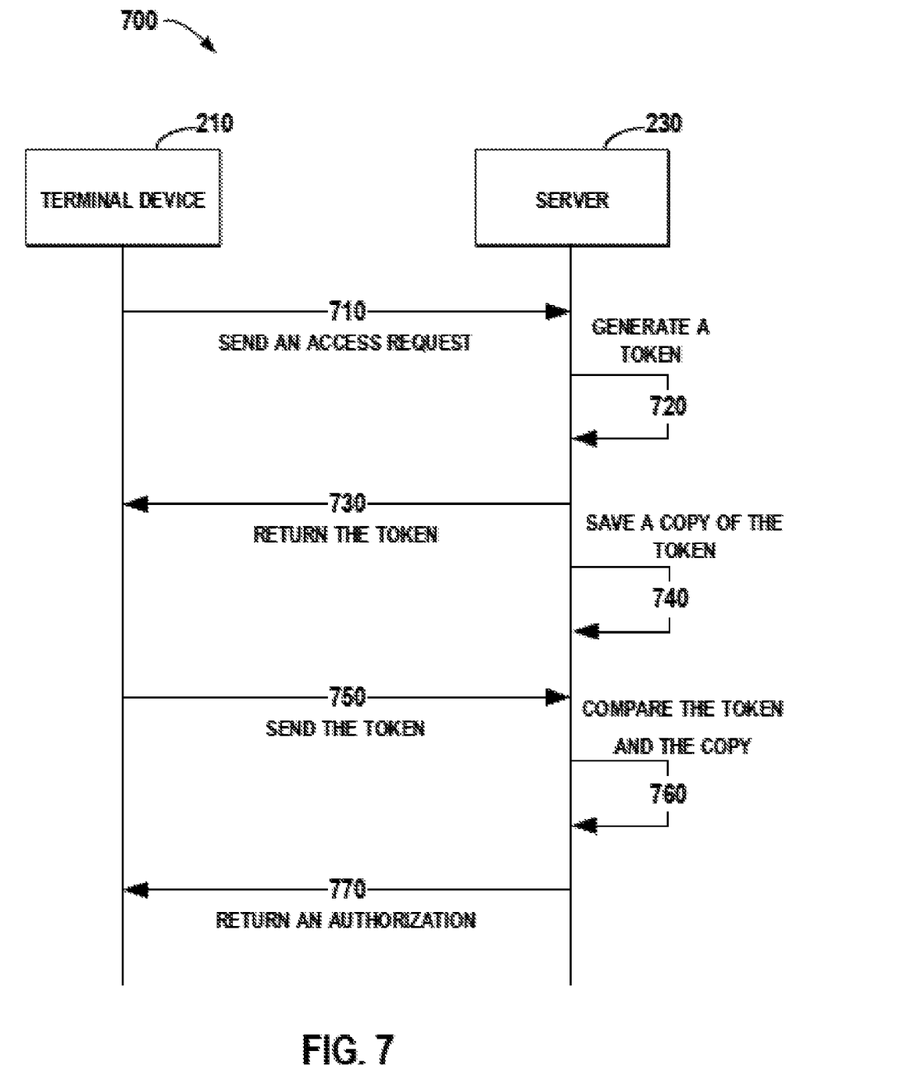
FIG. 7 schematically illustrates an example diagram for access control according to one implementation of the present disclosure.

FIG. 7 schematically illustrates an example diagram 700 for access control according to one implementation of the present disclosure, where a series of actions performed at both the terminal device 210 and the server 230 are illustrated. The actions indicated by steps 710 to 740 illustrate the procedure for obtaining the token to the terminal device 210. At step 710, an access request may be sent from the terminal device 210 to the server 230. In response to receiving the access request, the server 230 may generate a token at step 720. At step 730, the generated token may be returned to the terminal device 210. At step 740, a copy of the token may be saved in a database. Further, the actions indicated by steps 750 to 770 illustrate the procedure for verifying the token. At step 750, the token may be sent to server 230, and then the token may be compared with the copy stored in the database. Based on a result of the comparison, an authorization may be generated and sent to the terminal device 210 at step 770.

According to one implementation of the present disclosure, a computer-implemented method is proposed. According to the method, a token for accessing an object is received from a terminal device via a communication channel, where the communication channel is built based on a Light Fidelity connection which is deployed within a restrictive area. A validity of the received token is determined. An access to the object is controlled based on the validity of the received token.

According to one implementation of the present disclosure, a computing system is proposed. The computing system comprises a computer processor coupled to a computer-readable memory unit, the memory unit comprising instructions that when executed by the computer processor implements a method. In the method, a token for accessing an object is received from a terminal device via a communication channel, where the communication channel is built based on a Light Fidelity connection which is deployed within a restrictive area. A validity of the received token is determined. An access to the object is controlled based on the validity of the received token.

According to one implementation of the present disclosure, a computer program product is proposed. The computer program product comprises a computer readable storage medium having program instructions embodied therewith, the program instructions executable by an electronic device to cause the electronic device to: receive a token for accessing an object from a terminal device via a communication channel, the communication channel being built based on a Light Fidelity connection which is deployed within a restrictive area; determine a validity of the received token; and control an access to the object based on the validity of the received token.

According to one implementation of the present disclosure, a communication channel is built based on a Light Fidelity connection which is deployed within a restrictive area. A token for accessing an object is sent to a server via the communication channel. An authorization for accessing the object is obtained from the server, where the authorization is determined from the token.

According to one implementation of the present disclosure, the communication channel is built in response to a terminal device being within a restrictive area.

According to one implementation of the present disclosure, an access request for the token is sent to the server upon logging into the terminal device. The token may then be received from the server in response to the access request being accepted by the server.

According to one implementation of the present disclosure, the token is invalidated in response to a timestamp of the token being expired.

According to one implementation of the present disclosure, in response to the communication channel being disconnected, a validity of the saved copy is identified as invalid.

According to one implementation of the present disclosure, in response to the terminal device being within a further restrictive area, a further communication channel is built based on a further Light Fidelity connection which is deployed within the further restrictive area. A further token for accessing a further object is sent to the server via the further communication channel. A further authorization for accessing the further object is obtained from the server, where the further authorization is determined from the further token.

According to one implementation of the present disclosure, the token is with an updated version received from the server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
    receiving a token for accessing an object from a terminal device via a communication channel, wherein the communication channel is a Light Fidelity (Li-Fi) connection which is deployed within a restrictive area and wherein the terminal device comprises a smartphone of a user;
    in response to receiving an access request, determining a privilege of the user of the terminal device, wherein the privilege of the user is defined by accessing an object list, wherein the object list includes one or more objects that are accessible to the user, and wherein determining a privilege of the user of the terminal device further comprises;
        generating the token based on the privilege of the user;
        sending the generated token to the terminal device; and
        saving a copy of the generated token;
    determining a validity of a received token, wherein determining the validity of the received token comprises:
        in response to the received token matching the saved copy of the generated token, identifying the validity of the received token as valid;
        in response to a timestamp of the received token being expired, identifying the validity of the received token as invalid; and
        in response to the communication channel being disconnected, identifying the validity of the saved copy of the generated token as invalid;
    updating the privilege of the user, in response to receiving a further access request, wherein updating the privilege of the user comprises:
        updating the token based on the updated privilege of the user; and
        sending the updated token to the terminal device; and
    controlling access to the object based on the validity of the received token.

* * * * *